US011551038B2

(12) United States Patent
Chaudhuri et al.

(10) Patent No.: US 11,551,038 B2
(45) Date of Patent: Jan. 10, 2023

(54) UNIFIED SHAPE REPRESENTATION

(71) Applicant: Adobe Inc., San Jose, CA (US)

(72) Inventors: Siddhartha Chaudhuri, West Bengal (IN); Vladimir Kim, Seattle, WA (US); Matthew Fisher, San Carlos, CA (US); Sanjeev Muralikrishnan, Mumbai (IN)

(73) Assignee: Adobe Inc., San Jose, CA (US)

( * ) Notice: Subject to any disclaimer, the term of this patent is extended or adjusted under 35 U.S.C. 154(b) by 824 days.

(21) Appl. No.: 16/459,420

(22) Filed: Jul. 1, 2019

(65) Prior Publication Data

US 2021/0004645 A1 Jan. 7, 2021

(51) Int. Cl.
| | |
|---|---|
| *G06K 9/62* | (2022.01) |
| *G06K 9/00* | (2022.01) |
| *G06N 7/00* | (2006.01) |
| *G06N 3/02* | (2006.01) |
| *G06F 17/16* | (2006.01) |
| *G06V 10/75* | (2022.01) |
| *G06V 20/64* | (2022.01) |

(52) U.S. Cl.
CPC ........... *G06K 9/6257* (2013.01); *G06F 17/16* (2013.01); *G06K 9/6264* (2013.01); *G06N 3/02* (2013.01); *G06N 7/005* (2013.01); *G06V 10/757* (2022.01); *G06V 20/653* (2022.01)

(58) Field of Classification Search
CPC .. G06K 9/6257; G06K 9/6264; G06V 20/653; G06V 10/757; G06F 17/16; G06N 3/02; G06N 7/005
See application file for complete search history.

(56) References Cited

U.S. PATENT DOCUMENTS

2020/0210808 A1\* 7/2020 Dong .................... G06N 20/00

OTHER PUBLICATIONS

Achlioptas et al., "Learning Representations and Generative Models for 3D Point Clouds", 2018, Proceedings of the 35 th International Conference on Machine Learning, Stockholm, Sweden, PMLR 80 (10 pages) (Year: 2018).\*

Atzmon et al., Point Convolutional Neural Networks by Extension Operators, ACM Transactions on Graphics, vol. 37, No. 4, Article 71, Aug. 2018, pp. 71:1-71:12.

(Continued)

*Primary Examiner* — David F Dunphy
(74) *Attorney, Agent, or Firm* — Kilpatrick Townsend & Stockton LLP

(57) ABSTRACT

Techniques are described herein for generating and using a unified shape representation that encompasses features of different types of shape representations. In some embodiments, the unified shape representation is a unicode comprising a vector of embeddings and values for the embeddings. The embedding values are inferred, using a neural network that has been trained on different types of shape representations, based on a first representation of a three-dimensional (3D) shape. The first representation is received as input to the trained neural network and corresponds to a first type of shape representation. At least one embedding has a value dependent on a feature provided by a second type of shape representation and not provided by the first type of shape representation. The value of the at least one embedding is inferred based upon the first representation and in the absence of the second type of shape representation for the 3D shape.

20 Claims, 12 Drawing Sheets

(56) References Cited

OTHER PUBLICATIONS

Ben-Hamu et al., Multi-chart Generative Surface Modeling, ACM Transactions on Graphics (TOG), vol. 37, No. 6, Article No. 215, Nov. 2018, pp. 215:1-215:15.

Boscaini et al., Learning Shape Correspondence with Anisotropic Convolutional Neural Networks., 30th Conference on Neural Information Processing Systems, May 20, 2016, 9 pages.

Chang et al., ShapeNet: An information-Rich 3D Model Repository, Computer Science, Graphics, Dec. 9, 2015, 10 pages.

Dai et al., ScanNet: Richly-annotated 3D Reconstructions of Indoor Scenes, Computer Vision and Pattern Recognition (cs.CV), Apr. 11, 2017, 22 pages.

Fan et al., A Point Set Generation Network for 3D Object Reconstruction from a Single Image, Computer Vision and Pattern Recognition (cs.CV), Available online at: https://arxiv.org/abs/1612.00603, Dec. 7, 2016, 12 pages.

Fey et al., SplineCNN: Fast Geometric Deep Learning with Continuous B-spline Kernels, Computer Vision and Pattern Recognition (cs.CV), Available online at: https://arxiv.org/abs/1711.08920, May 23, 2018, 9 pages.

Girdhar et al., Learning a Predictable and Generative Vector Representation for Objects, Computer Vision and Pattern Recognition (cs.CV), ECCV, Available Online at: https://arxiv.org/abs/1603.08637, Aug. 31, 2016, 26 pages.

Groueix et al., AtlasNet: A Papier-Mâché Approach to Learning 3D Surface Generation, Computer Vision and Pattern Recognition (cs.CV), Jul. 20, 2018, 16 pages.

Hegde et al., FusionNet: 3D Object Classification Using Multiple Data Representations, Computer Vision and Pattern Recognition (cs.CV), Available online at: https://arxiv.org/abs/1607.05695, Nov. 27, 2016, 9 pages.

Huang et al., Learning Local Shape Descriptors from Part Correspondences with Multiview Convolutional Networks, ACM Transactions on Graphics, vol. 37, No. 1, Article 6, Nov. 2017, pp. 6:1-6:14.

Kalogerakis et al., 3D Shape Segmentation with Projective Convolutional Networks, Computer Vision and Pattern Recognition (cs.CV); Graphics (cs.GR), Available online at: https://arxiv.org/pdf/1612.02808.pdf, Nov. 13, 2017, 11 pages.

Kanezaki, RotationNet: Learning Object Classification Using Unsupervised Viewpoint Estimation, Computer Vision and Pattern Recognition (cs.CV), Mar. 20, 2016, 16 pages.

Kim et al., Learning Part-based Templates from Large Collections of 3D Shapes, ACM Transactions on Graphics, vol. 32, No. 4, Article No. 70, Jul. 2013, 12 pages.

Kingma et al., Adam: A Method for Stochastic Optimization, In International Conference on Learning Representations, 2015, pp. 1-15.

Kingma et al., Auto-Encoding Variational Bayes, Machine Learning (stat.ML); Machine Learning (cs.LG), May 1, 2014, 14 pages.

Kostrikov et al., Surface Networks, Computer Vision and Pattern Recognition (cs.CV), Jun. 18, 2018, 27 pages.

Li et al., Joint Embeddings of Shapes and Images via CNN Image Purification, In SIGGRAPH Asia, 2015, 12 pages.

Li et al., SO-Net: Self-organizing Network for Point Cloud Analysis, Computer Vision and Pattern Recognition, Mar. 27, 2018, 17 pages.

Maron et al., Convolutional Neural Networks on Surfaces via Seamless Toric Covers, Journal ACM Transactions on Graphics, vol. 36, No. 4, Article No. 71, Jul. 2017, pp. 71:1-71:10.

Masci et al., Geodesic Convolutional Neural Networks on Riemannian Manifolds, IEEE International Conference on Computer Vision Workshop, 2015, pp. 832-840.

Maturana et al., VoxNet: A 3D Convolutional Neural Network for Real-Time Object Recognition, International Conference on Intelligent Robots and Systems (IROS), 2015, 7 pages.

Muralikrishnan et al., Tags2parts: Discovering Semantic Regions from Shape Tags, Computer Vision and Pattern Recognition (cs.CV); Graphics (cs.GR), Apr. 30, 2018, 14 pages.

Qi et al., PointNet: Deep Learning on Point Sets for 3D Classification and Segmentation, Computer Vision and Pattern Recognition (cs.CV), Apr. 10, 2017, pp. 1-19.

Qi et al., PointNet++: Deep Hierarchical Feature Learning on Point Sets in a Metric Space, 31st Conference on Neural Information Processing Systems, Jun. 7, 2017, 14 pages.

Qi et al., Volumetric and Multi-View CNNs for Object Classification on 3D Data, IEEE Conference on Computer Vision and Pattern Recognition (CVPR), Apr. 29, 2016, 14 pages.

Riegler et al., OctNet: Learning Deep 3D Representations at High Resolutions, IEEE Conference on Computer Vision and Pattern Recognition (CVPR), Apr. 10, 2017, 21 pages.

Savva et al., Large-Scale 3D Shape Retrieval from ShapeNet Core55, Eurographics Workshop on 3D Object Retrieval, 2017, 12 pages.

Schroff et al., FaceNet: A Unified Embedding for Face Recognition and Clustering, In Proceedings of the IEEE Computer Society Conference on Computer Vision and Pattern Recognition, 2015, pp. 815-823.

Shin et al., Pixels, Voxels, and Views: A Study of Shape Representations for Single View 3D Object Shape Prediction, Computer Vision and Pattern Recognition (cs.CV), Jun. 12, 2018, 9 pages.

Sinha et al., Deep Learning 3D Shape Surfaces Using Geometry Images, European Conference on Computer Vision, 2016, pp. 223-240.

Sinha et al., SurfNet: Generating 3D Shape Surfaces using Deep Residual Networks, Computer Vision and Pattern Recognition (cs.CV), Mar. 12, 2017, 10 pages.

Su et al., Multi-View Convolutional Neural Networks for 3D Shape Recognition, IEEE International Conference on Computer Vision (ICCV), 2015, 9 pages.

Su et al., SPLATNet: Sparse Lattice Networks for Point Cloud Processing, Computer Vision and Pattern Recognition (cs.CV), May 9, 2018, 12 pages.

Wang et al., Adaptive O-CNN: A Patch-Based Deep Representation of 3D Shapes, ACM Transactions on Graphics, Sep. 21, 2018, 12 pages.

Wang et al., O-CNN: Octree-Based Convolutional Neural Networks for 3D Shape Analysis, ACM Transactions on Graphics, vol. 36, No. 4, Article 7, Jul. 2017, 11 pages.

Wu et al., 3D ShapeNets: A Deep Representation for Volumetric Shapes, Computer Vision and Pattern Recognition (cs.CV), 2015, 9 pages.

Wu et al., Learning a Probabilistic Latent Space of Object Shapes via 3D Generative-Adversarial Modeling, 29th Conference on Neural Information Processing Systems (NIPS 2016), Barcelona, Spain, Jan. 4, 2017, 11 pages.

Xu et al., PointFusion: Deep Sensor Fusion for 3D Bounding Box Estimation, Computer Vision and Pattern Recognition (cs.CV), Available online at: https://arxiv.org/pdf/1711.10871.pdf, Aug. 25, 2018, 11 pages.

Zeng et al., 3DMatch: Learning Local Geometric Descriptors from RGB-D Reconstructions, Computer Vision and Pattern Recognition (cs.CV), Available online at: https://arxiv.org/abs/1603.08182, Apr. 9, 2017, 12 pages.

Zhu et al., Deep Learning Representation Using Autoencoder for 3D Shape Retrieval, Neurocomputing, vol. 204, Apr. 8, 2016, pp. 41-50.

\* cited by examiner

UNIFIED SHAPE REPRESENTATION

TECHNICAL FIELD

The present disclosure relates generally to using artificial intelligence to generate improved representations of three-dimensional (3D) shapes. More specifically, but not by way of limitation, this disclosure relates to generating a unified shape representation for a 3D shape, where the unified shape representation encompasses features of different types of shape representations and can be used efficiently for various downstream operations.

BACKGROUND 3D shapes come in a variety of representations, each capturing different aspects of a shape. Examples include polygon meshes, voxel grids, point clouds, projected images, multi-view projections, depth maps, implicit functions, and others. Each existing type of shape representation has its advantages and disadvantages. For example, voxel grids are lower resolution, but more structured compared to point clouds, while multi-view images can fail to capture parts of the surface of a 3D shape.

Computing systems can perform various tasks using a shape representation as an input. For purposes of shape analysis and other shape-related tasks, some shape representations are better suited for certain tasks than other shape representations. For example, a voxel grid representation of a 3D shape can be input to a neural network configured to predict a category/class of the 3D shape (e.g., a car, an airplane, a person, etc.) based on the voxel grid representation. Computing systems that process shape representations are generally designed to use only certain types of shape representations based upon the processing to be performed. Each representation is suited for some specific tasks, but none of the existing representations are suitable for the multiple commonly performed shape analysis tasks. For example, one system might be tailored to using voxel grid representations, while another system may not be capable of accepting voxel grids as input. Some systems attempt to convert one type of shape representation into a different type of shape representation, but are unable to generate a unified shape representation. Other systems attempt to combine different types of shape representations by aggregating the features of the different types of shape representations, but the aggregated features are combined in such a way that the resulting representation is not suitable for a variety of tasks. Further, in order to generate a shape representation for a given 3D shape, these other systems require the availability of different types of representations for the 3D shape at the time of generating the shape representation.

SUMMARY

Embodiments are described herein for generating and using a unified shape representation for 3D shapes that encompasses features of different types of shape representations, which enables the unified representation to be applied across different tasks while taking advantage of the capabilities afforded by the different types of representations. The different types of representations include at least one type of representation that is not available for a 3D shape at the time that a unified representation is to be generated for the 3D shape. In contrast to some of the conventional systems discussed above, the techniques disclosed herein enable a unified representation to be generated that not only encompasses features of different types of shape representations, but is also generated using fewer than all of the encompassed types of shape representations as input. Thus, generating the unified representation for the 3D shape involves generating information relating to shape representations that are presently unavailable for the 3D shape. In certain embodiments, the unified representation is used as input to a downstream operation, e.g., a shape analysis task. Additionally, because the unified representation encompasses features of different types of representations, the unified representation can be converted into any one of the different types of representations, e.g., for use in downstream operations that may require a particular type of representation.

In certain embodiments, artificial intelligence techniques are used to infer a unified shape representation given an existing input 3D shape representation. Inferring the unified shape representation includes inferring values (or embeddings) based upon features present in the input 3D shape representation and also by inferring or hallucinating values (embeddings) that depend on features (e.g., shape attributes) that are not present in the input representation, but which would be included in a different type of representation for the same shape.

In certain embodiments, a trained neural network model is used to infer the unified shaped representation for a 3D shape. The neural network includes an encoder neural network and a decoder neural network. In certain embodiments, a particular type of 3D shape representation is provided as input to the encoder neural network, which is configured to generate a unified shape representation for the 3D shape represented by the input representation. The unified shape representation generated by the encoder neural network is input to the decoder neural network, which is configured to convert the unified representation into a target representation of the same or a different type than that which was used by the encoder neural network to generate the unified representation. The unified representation and/or the target representation can be applied as input to one or more downstream operations such as shape segmentation, retrieval of similar shapes, and identifying correspondences between an input shape and other shapes.

In certain embodiments, a neural network comprising an encoder neural network and a decoder neural network is trained using a loss function that, when minimized by adjusting parameters used by the encoder neural network and the decoder neural network, improves the accuracy of unicode representations generated by the encoder neural network and the accuracy of target shape representations generated by the decoder neural network. Examples of different loss functions, including a loss function that combines several loss functions, are described below. Training is performed using different types of representations for different types of shapes.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
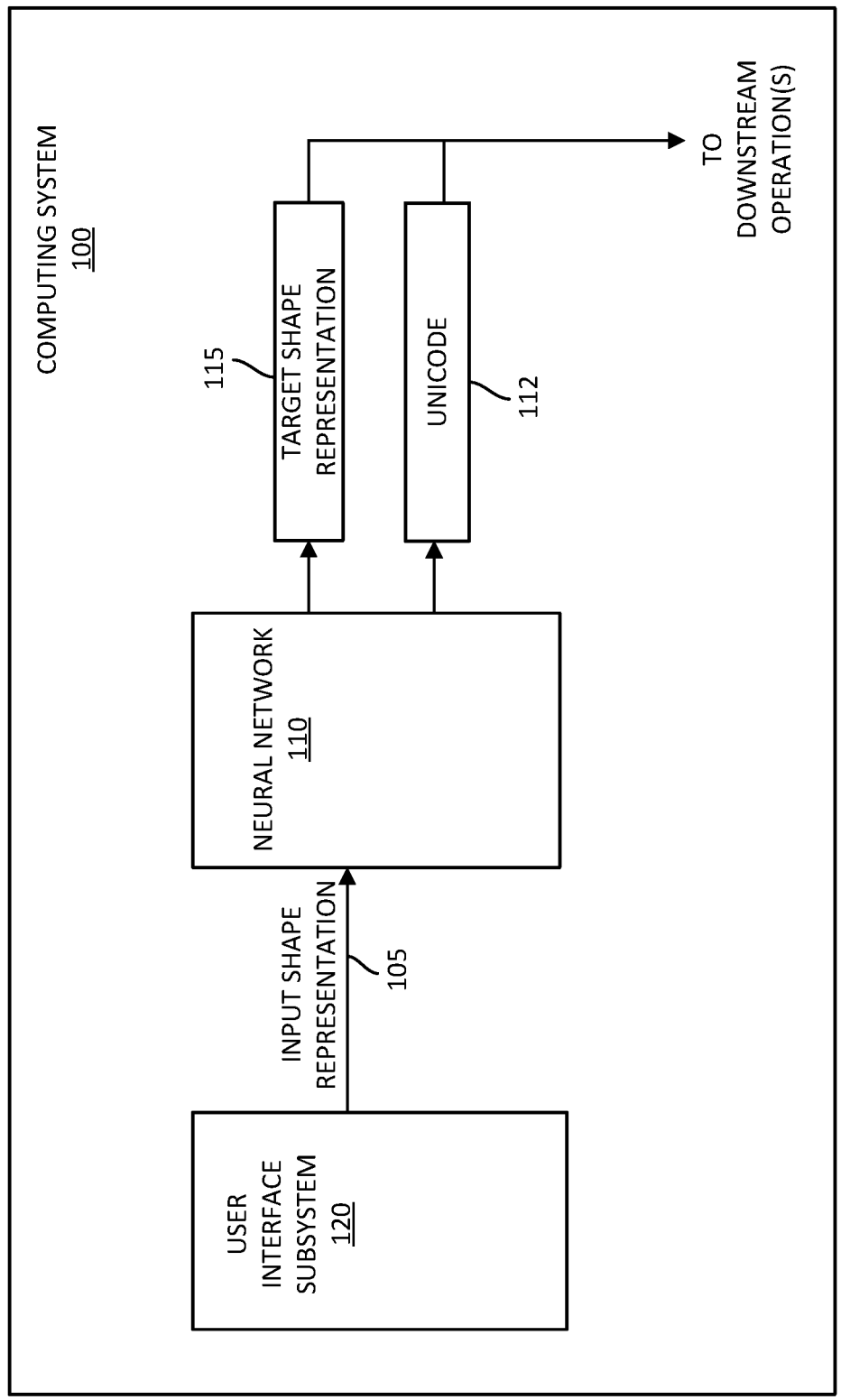
FIG. 1 is a block diagram depicting an example of a computing system including a neural network, according to certain embodiments.

Embodiments are described herein for generating and using a unified shape representation for 3D shapes that encompasses features of different types of shape representations, which enables the unified representation to be applied across different tasks while taking advantage of the capabilities afforded by the different types of representations. The different types of representations include at least one type of representation that is not available for a 3D shape at the time that a unified representation is to be generated for the 3D shape. In contrast to some of the conventional systems discussed above, the techniques disclosed herein enable a unified representation to be generated that not only encompasses features of different types of shape representations, but is also generated using fewer than all of the encompassed types of shape representations as input. Thus, generating the unified representation for the 3D shape involves generating information relating to shape representations that are presently unavailable for the 3D shape. In certain embodiments, the unified representation is used as input to a downstream operation, e.g., a shape analysis task. Additionally, because the unified representation encompasses features of different types of representations, the unified representation can be converted into any one of the different types of representations, e.g., for use in downstream operations that may require a particular type of representation.

Illustrative examples are described in connection with the following types of shape representations: voxel grid (e.g., a binary 3D array of voxels), point cloud (e.g., a set of point coordinates in three dimensions), and multi-image (e.g., multiple two-dimensional (2D) images of a shape from different perspectives). However, the techniques described herein can be applied to other types of shape representations (e.g., polygon meshes or depth maps) and are not specifically limited to the types of shape representations discussed herein.

Techniques are described herein for generating, using an artificial intelligence model that has previously been trained on different types of shape representations, a unified representation for a 3D shape based on an input representation for the 3D shape. In certain embodiments, the unified representation is a unicode comprising a vector of embeddings and their associated values. The unicode is an improvement over conventional shape representations in several respects. For instance, because the unicode encompasses features of different types of shape representations, the unicode could be used for different tasks that would otherwise have required multiple types of representations to be made separately available. Thus, the unicode provides more information and has a greater range of applicability than a single type of shape representation. Additionally, because the unicode is generated using fewer than all of the different types of representations encompassed by the unicode, the unicode is generated using less information than conventional techniques that aggregate features of different types of shape representations. This is advantageous because multiple types of shape representations are not usually available for any given 3D shape. In certain embodiments, the unicode is generated using a single input representation for a 3D shape. The input representation corresponds to a particular type of shape representation (e.g., a voxel grid, a point cloud, or a multi-image representation).

In certain embodiments, the artificial intelligence model is implemented as a neural network comprising an encoder neural network and a decoder neural network. The encoder neural network is capable of generating a unicode from an input representation corresponding to any of a plurality of different types of shape representations. In this sense, the encoder neural network can be conceptually thought of as having an encoder for each type of representation that the encoder neural network is trained to process. The encoder neural network is configured to take an input representation of a particular type and generate a corresponding unicode comprising a vector of embeddings. The encoder neural network infers values for the embeddings based on the features of the input representation. The embedding values are dependent upon features of different types of shape representations. For example, the unicode generated for an input representation corresponding to a voxel grid can depend on features of a voxel grid representation in addition to depending on features of point cloud and multi-image representations. Thus, the encoder neural network is able to generate a unicode for a 3D shape using only a single type of shape representation as input.

In certain embodiments, the decoder neural network is configured to take a unicode generated by the encoder neural network and convert the unicode into a particular type of shape representation. The decoder neural network is capable of converting the unicode into any of the plurality of different types of shape representations that the decoder neural network is trained to process, irrespective of which type of shape representation was used to generate the unicode. For example, the shape representation generated by the decoder neural network does not have to be of the same type as the shape representation used to generate the unicode.

Techniques are also described herein for training an artificial intelligence based system to generate unicodes and to convert unicodes into target representations. In certain embodiments, a neural network is trained to minimize a loss function associated with a unicode. The loss function represents one or more types of losses such as reconstruction loss, embedding loss, classification loss, or a combination thereof. Training involves, for example, adjusting weights and/or bias values used by the neural network.

Reconstruction loss corresponds to a difference between a target representation generated by the decoder neural network based on a unicode, and a ground truth representation, where the encoder neural network generates the unicode based on a particular input shape representation. When the type of shape representation used by the encoder neural network to generate the unicode is different from the type of shape representation to which the target representation corresponds, the reconstruction loss is a cross-representation reconstruction loss. Training on cross-representation reconstruction losses enables the encoder neural network to better infer embedding values that depend upon features provided by a type of shape representation other than that which was used by the encoder neural network for generating the unicode. For example, if the target representation is a point cloud and the unicode was generated using a voxel grid, training the encoder neural network to minimize the reconstruction loss between the point cloud generated by the decoder neural network and a ground truth point cloud would enable the encoder neural network to better infer features for point cloud representations given a voxel grid as input to the encoder neural network. Similarly, training on cross-representation reconstruction losses enables the decoder neural network to better infer, based upon the unicode provided as input to the decoder neural network, features for a type of shape representation other than that which was used to generate the unicode.

Embedding loss corresponds to a difference between a unicode produced by the encoder neural network using a first type of shape representation (e.g., voxel grid) and a unicode produced by the encoder neural network using a second, different type of shape representation (e.g., point cloud). In certain embodiments, the encoder neural network is trained to minimize the embedding losses for each possible pairing of different shape representation types. Training on embedding losses enables the encoder neural network to generate similar unicodes for a given 3D shape based on different types of input representations for the 3D shape.

Classification loss corresponds to errors in the predictions produced by a classifier that operates on the unicodes generated by the encoder neural network. In certain embodiments, the neural network includes a classifier that predicts the class of a 3D shape (e.g., whether the 3D shape is a car, a plane, or a person) based on a unicode generated for the 3D shape. The classifier predicts the class of the 3D shape by inferring, based upon an input unicode, a probability that the 3D shape belongs to a particular class of shape. In certain embodiments, the classification loss is a cross-entropy classification loss calculated by summing classification losses across the unicodes generated from different types of shape representations. Training the encoder neural network to minimize classification loss encourages the unicodes generated for 3D shapes belonging to the same class to map to the same region within an embedding space. Different shape classes would map to different regions of the embedding space, thereby improving the accuracy of certain downstream operations that rely upon unicode, for example, tasks that involve shape discrimination.

FIG. 1 shows an example computing system 100, according to certain embodiments. The computing system 100 includes a neural network (NN) 110 and a user interface (UI) subsystem 120. FIG. 1 is a simplified illustration. The computing system 100 generally includes additional components not depicted, such as one or more processors (e.g., processors executing the NN 110), memory, infrastructure for communications between components internal to the computing system 100 or communications with external components, and the like. Examples of such additional components are described in connection with the embodiments of FIGS. 11 and 12.

UI subsystem 120 is configured to interact with a user through one or more computing devices such as a keyboard, a display monitor, audio speakers, and the like. In certain embodiments, UI subsystem 120 provides a user interface through which the user provides input for configuring the NN 110. The user input is processed by the computing system 100 to train the NN 110 prior to executing the NN 110 on non-training data. The user interface is further configured to receive input for executing the NN 110, for example, in the form of program code and/or data such as a computer file containing shape representations.

NN 110 implements an artificial intelligence model through at least one neural network. In certain embodiments, NN 110 comprises multiple subnetworks, each subnetwork being a standalone neural network. NN 110 is configured to process multiple types of shape representations. The processing performed by NN 110 includes generating, based upon an input shape representation 105, a unicode 112 and a target shape representation 115.

A neural network generally includes an input layer, an output layer, and one or more intermediate layers (sometimes referred to as hidden layers). The output layer produces a result, for example, an inference relating to some input data supplied to the input layer. Each layer is configured to perform certain computations upon the data that is input to the layer. Each layer comprises a set of nodes that are connected to the nodes of the previous and/or next layer. In a fully-connected layer, each node of the fully-connected layer is connected to every node of the previous and/or next layer. These connections are used to propagate information (e.g., an output activation of a node) between layers and typically have associated weights. One example of a computation sometimes performed by a layer of a neural network is to multiply a matrix of input values with a matrix of weight values, add a bias value to the product of the multiplication, and then apply a mathematical function such as a non-linear function. Examples of non-linear functions include sigmoid and hyperbolic tangent. Pooling is another type of operation sometimes performed in a neural network and involves combining the outputs of a set of nodes by, for example, computing a maximum value, a minimum value, or a mean value.

Neural networks come in different forms, including convolutional neural networks and recurrent neural networks. Convolutional neural networks implement a convolution operation as a matrix multiplication or vice versa. Recurrent neural networks carry state information across layers. The processing performed by the layers of a recurrent neural network is dependent on this state information. Neural networks can be trained to perform specific tasks, such as detecting the presence of a face in an image or determining the class of an object depicted in an image. Training generally involves generating an output using training data as input, then adjusting the weights and/or biases used by the neural network in order to reduce the amount of error in the output. Neural networks are usually trained using large data sets, for example, hundreds or thousands of training images.

FIG. 1 depicts certain runtime operations of the computing system 100. Details regarding training of neural networks in accordance with various embodiments will be described later. As depicted in FIG. 1, UI subsystem 120 provides the input shape representation 105 as input to NN 110. The NN 110 generates, based on its prior training and the input shape representation 105, a unicode 112. Additionally, in certain embodiments, NN 110 also generates one or more target shape representations 115. The unicode 112 and/or the target shape representation 115 are then input to one or more downstream operations. In certain embodiments, at least some of the downstream operations are performed locally within computing system 100. Downstream operations can also be performed by an external computing system such as a cloud server communicatively coupled to the computing system 100 over a network such as the Internet.

Unicode 112 comprises a vector of embeddings and their associated values. The size of the vector depends on the size of the input shape representation 105. For example, if the input shape representation 105 is a voxel grid with $32^3$ voxels, the unicode 112 can be encoded as a 1,024 dimension vector. Similarly, a 1,024 dimension unicode is, in certain embodiments, generated from a 1024×3 point cloud or a 4×128×128 multi-view representation comprising four 128 pixel by 128 pixel images (e.g., front, back, left, and right side images of the same shape). The NN 110 is configured to, based on its prior training, infer the values of the embeddings using the input shape representation 105. The embedding values are generated in an embedding layer of the NN 110, with each embedding being assigned to a respective node in the embedding layer.

Input shape representation 105 corresponds to one type of shape representation (e.g., voxel grid, point cloud, or multi-image). The embedding values depend upon features provided by the input shape representation 105. Additionally, some of the embedding values depend on features that are not present in input shape representation 105, but are instead provided by a different type of shape representation. In certain embodiments, the embedding values of the unicode 112 depend upon features provided by voxel grid, point cloud, and multi-image representations. Thus, if the input shape representation 105 is a voxel grid, the NN 110 will map the features provided by the voxel grid representation to corresponding embedding values. Further, because the voxel grid representation lacks features provided by point cloud and multi-image representations, the NN 110 will infer, based upon the voxel grid representation, embedding values that depend upon point cloud and multi-image representations. It is also possible to represent other combinations of shape representation types through a unicode.

Figure 2:
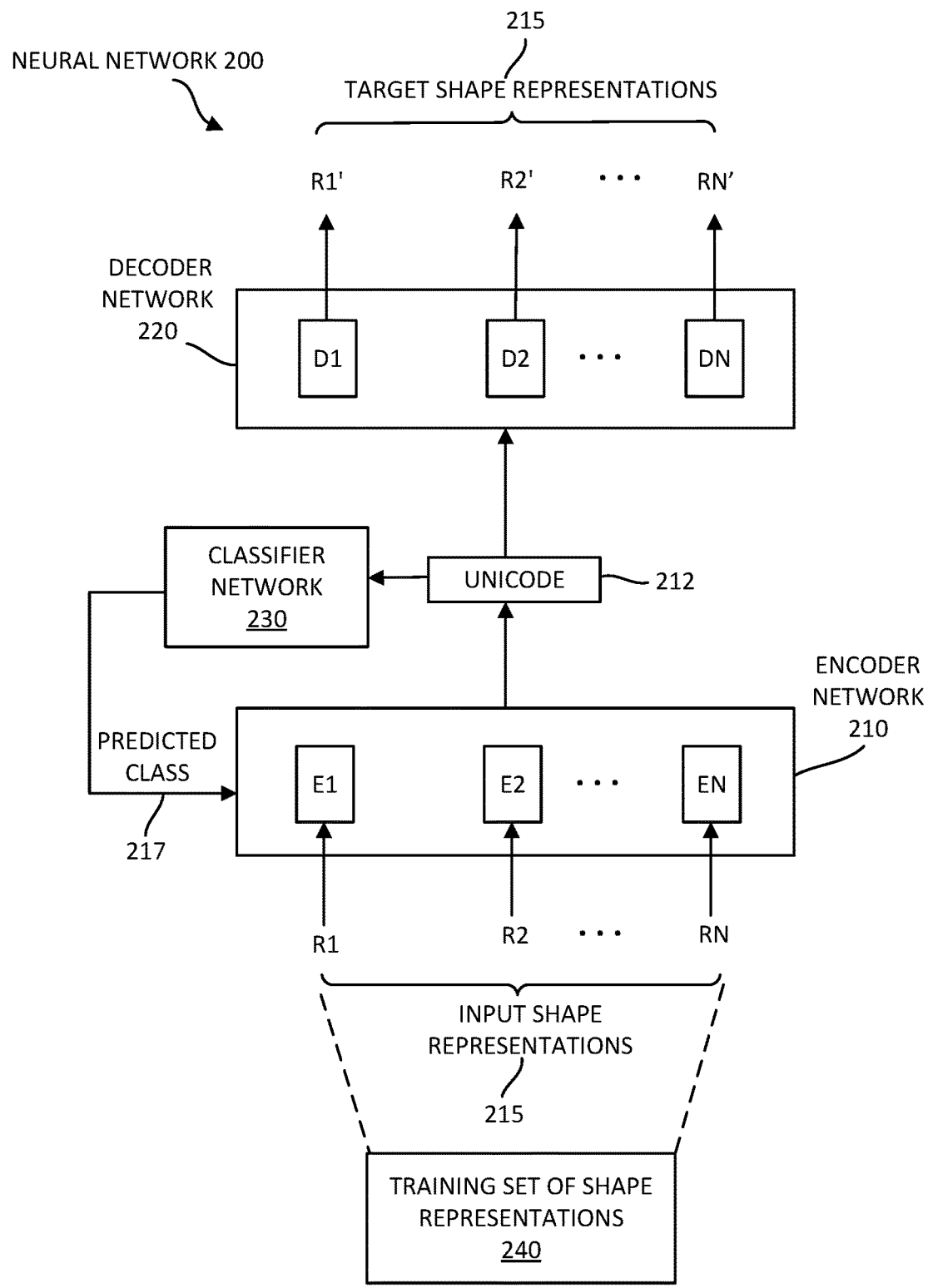
FIG. 2 is a block diagram depicting training of a neural network, according to certain embodiments.

FIG. 2 depicts training of a neural network 200, according to certain embodiments. The NN 200 is an implementation of NN 110 in FIG. 1. In the example of FIG. 2, the NN 200 comprises an encoder network and a decoder network 220. The encoder network 210 includes multiple encoders E1 to EN, each of which is a neural network. Similarly, the decoder network 220 includes multiple decoders D1 to DN, each of which is a neural network. Each encoder E1 to EN is configured to produce a unicode 212, which is analogous to the unicode 112 described in connection with FIG. 1. The NN 200 further comprises a classifier network (also referred to herein as a classifier) 230.

Each of the encoders E1 to EN is configured to generate a unicode 212 based upon a different type of shape representation. For example, E1 can be a voxel grid encoder that generates a unicode using a voxel grid representation R1, E2 a point cloud encoder that generates a unicode using a point cloud representation R2, and so on. During training, a set of input shape representations 215 is provided as input to the encoders E1 to EN. The set of input shape representations 215 includes representations of different shapes from a training set of shape representations 240 and, for each shape, different types of representations of that shape. Thus, during training, each encoder E1 to EN receives a respective representation of the same training shape. The resulting unicodes 212 are input to the decoder network 220 and the classifier 230 to train the encoder network 210 and/or the decoder network 220. In certain embodiments, the classifier 230 is also trained using the unicodes 212. With sufficient training, the unicodes 212 produced by encoders E1 to EN for any given shape will be similar, if not identical.

Each of the decoders D1 to DN is configured to generate, from a unicode 212, a corresponding target shape representation of a particular type. For example, D1 can be a voxel grid decoder that converts a unicode into a voxel grid representation R1', D2 a point cloud decoder that converts a unicode into a point cloud representation R2', and so on. With sufficient training, the representations generated by the decoders D1 to DN will be similar, if not identical, to the corresponding representations used to generate the unicodes 212 (e.g., R1 is the same as R1', R2 the same as R2', and so on).

In certain embodiments, the encoder network 210 and the decoder network 220 are trained by inputting, for a given training shape, each representation R1 to RN of the training shape into a corresponding one of the encoders E1 to EN to produce multiple unicodes 212 for the training shape, then inputting each of the unicodes 212 into the decoders D1 to DN to produce a set of target representations R1' to RN' from each unicode. The unicodes 212 and/or the target representations R1' to RN' are analyzed to determine whether the encoders E1 to EN and/or the decoders D1 to DN need to be reconfigured (e.g., by adjusting their weights and/or biases). As explained below in connection with FIGS. 8 to 10, this analysis involves determining a loss function representing one or more types of losses (e.g., the reconstruction loss, embedding loss, and classification loss mentioned earlier).

Classifier 230 is configured to output a predicted class 217 based upon a unicode 212. In certain embodiments, the classifier 230 is a shallow neural network (e.g., with a single, fully-connected hidden layer). When implemented as a shallow neural network, the classifier 230 is used strictly for training purposes. Deeper classifier networks are better suited for runtime classification tasks. The predicted class 217 is used to calculate a classification loss which, in certain embodiments, is a cross-entropy classification loss determined based upon a set of unicodes 212 generated by the encoders E1 to EN for representations of training shapes belonging to the same class (e.g., multiple representations of different car shapes). The classification loss is used to train the encoders E1 to EN such that unicodes generated for shapes belonging to the same class will map to the same region of an embedding space. Ideally, each class of shape will map to a distinct region that is well-separated from regions to which other classes map. When visualized using a T-distributed Stochastic Neighbor Embedding (t-SNE) plot, unicodes generated for shapes in the same class will be closely grouped together into a 2D blob that has little or no overlap with a blob corresponding to unicodes generated for shapes in a different class. In certain embodiments, the classifier 230 is also trained to improve the accuracy of the predictions generated based upon unicode. However, such training is optional since the primary use of the classifier 230 is for training the encoders E1 to EN rather than generating accurate predictions.

Examples of encoders and decoders for different types of shape representations will now be described in connection with FIGS. 3 to 6. The examples in FIGS. 3 to 6 are provided merely for illustration purposes to show a few ways in which neural networks can be constructed to handle specific types of shape representations.

Figure 3:
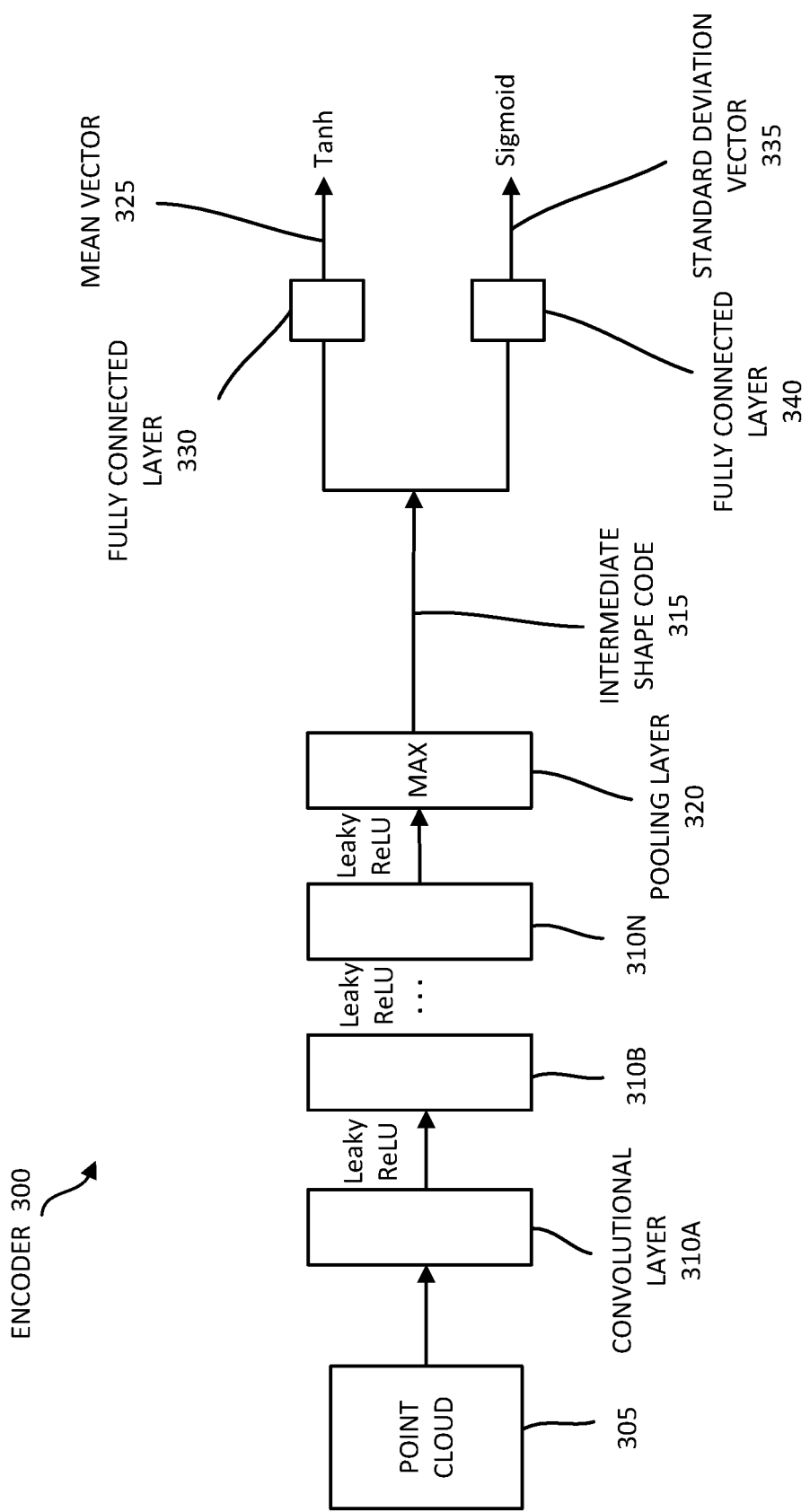
FIG. 3 is a block diagram depicting an example of an encoder for point cloud representations, according to certain embodiments.

FIG. 3 shows an encoder 300 for point cloud representations, according to certain embodiments. The encoder 300 receives a point cloud 305 as input to a first convolutional layer 310A of a series of convolutional layers 310A to 310N. In FIGS. 3 to 6, layers that are related and perform the same type of operation (e.g., convolution) are depicted using the same reference numeral, followed by a letter denoting a specific instance. However, such layers are not necessarily identical, e.g., layers can operate on data of different sizes, employ different stride lengths, and have different numbers of output channels. As an illustrative example, if the point cloud 305 is a 1,024×3 point cloud, the first convolutional layer 310A can employ a 1×3 weight matrix as a filter, use a stride length of one, and have sixty four output channels. The first convolutional layer 310A would be followed by four additional convolutional layers 310 configured with [filter size/stride length/number of output channels] as follows: [1×1/1/64], [1×1/1/64], [1×1/1/64], and [1×1/1/1,024]. In certain embodiments, each convolutional layer 310 is followed by an activation function that produces the input to the next layer. The activation function is, in some cases, a rectifier implemented using a leaky rectified linear unit (ReLU). ReLUs and leaky ReLUs are often used as a way to introduce non-linearity after performing a convolution.

The output of the final convolutional layer 310N would, in the case of a 1,024×3 point cloud, be a 1,024×1,024 matrix that is input to the pooling layer 320. The pooling layer 320 generates an intermediate shape code 315 by, for example, applying a MAX function to produce a 1,024 dimension vector based on the maximum values of the 1,024×1,024 matrix. In certain embodiments, the intermediate shape code 315 is the final output of the encoder 300. However, in the example of FIG. 3, the intermediate shape code 315 is further processed through a pair of fully-connected layers 330 and 340. The fully-connected layers 330 and 340 generate a mean vector 325 and a standard deviation vector 335, respectively.

The mean vector 325 and the standard deviation vector 335 respectively correspond to a mean and a standard deviation of a probability distribution (e.g., a Gaussian distribution) describing a neighborhood of unicodes to which the point cloud 305 maps. Thus, the mean vector 325 and the standard deviation vector 335 can be used to sample one or more unicodes within the neighborhood of unicodes. In this manner, the encoder 300 operates as a variational autoencoder that generates multiple unicodes rather than a single unicode. In certain embodiments, the sampling involves applying a hyperbolic tangent function to the mean vector 325 and a sigmoid function to the standard deviation vector 335. The mean vector 325 and the standard deviation vector 335 have the same dimensions as the intermediate shape code 315 (e.g., 1,024 dimensions).

Figure 4:
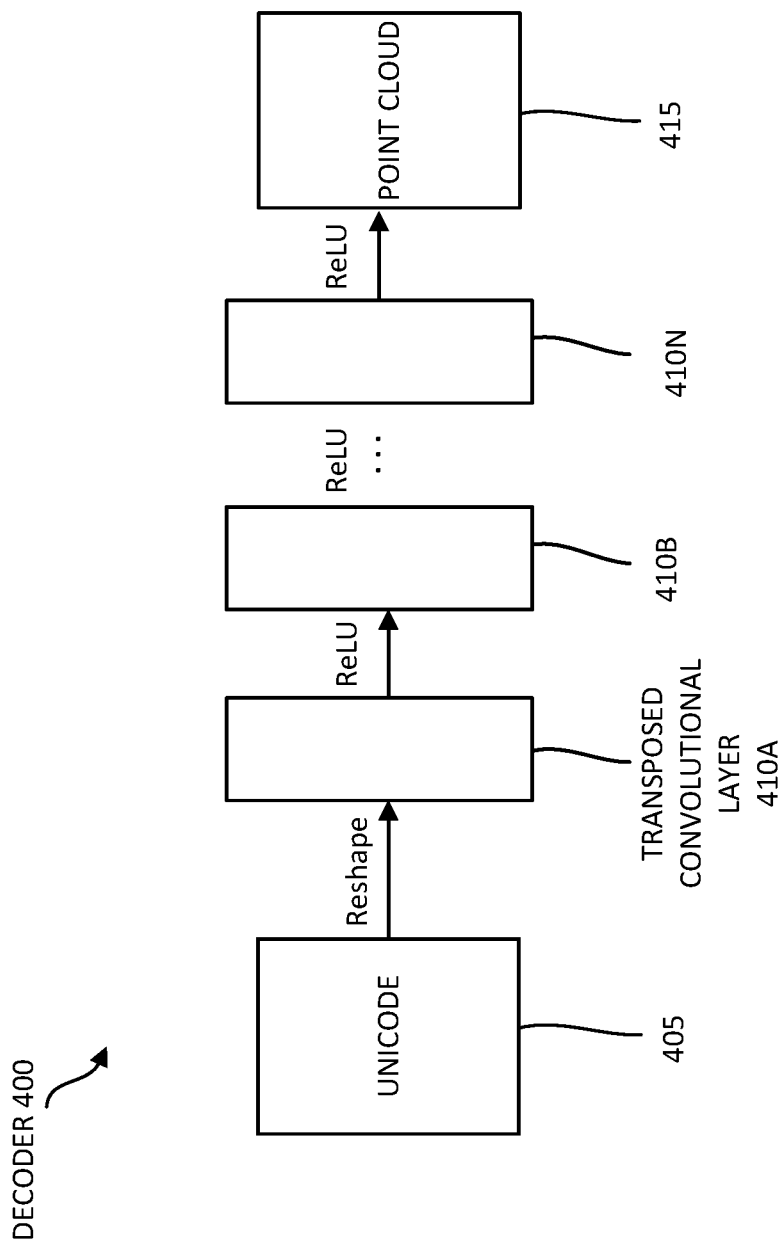
FIG. 4 is a block diagram depicting an example of an decoder for point cloud representations, according to certain embodiments.

FIG. 4 shows a decoder 400 for point cloud representations, according to certain embodiments. The decoder 400 receives a unicode 405. The unicode 405 is reshaped (e.g., as a 1×1×1,024 matrix) for input to a first transposed convolutional layer 410A of a series of transposed convolutional layers 410A to 410N. Each of the transposed convolutional layers 410 performs a transposed convolution. As with the convolutional layers 310A to 310N of the encoder 300, the transposed convolutional layers 410A to 410N can employ different filter sizes, stride lengths, and/or number of output channels. As an illustrative example, if the unicode 405 is a 1,024 dimension vector, the (reshaped) unicode 405 can be processed through a series of five transposed convolutional layers 410 configured with [filter size/stride length/number of output channels] as follows: [2×2/1/512], [3×3/1/256], [4×4/2/256], [5×5/3/128], and [1×1/1/3]. The output of the final transposed convolutional layer 410N would, in the case of a 1,024 dimension unicode, be a 1,024×3 point cloud. In certain embodiments, each transposed convolutional layer 410 is followed by an activation function implemented using, for example, a ReLU.

Figure 5:
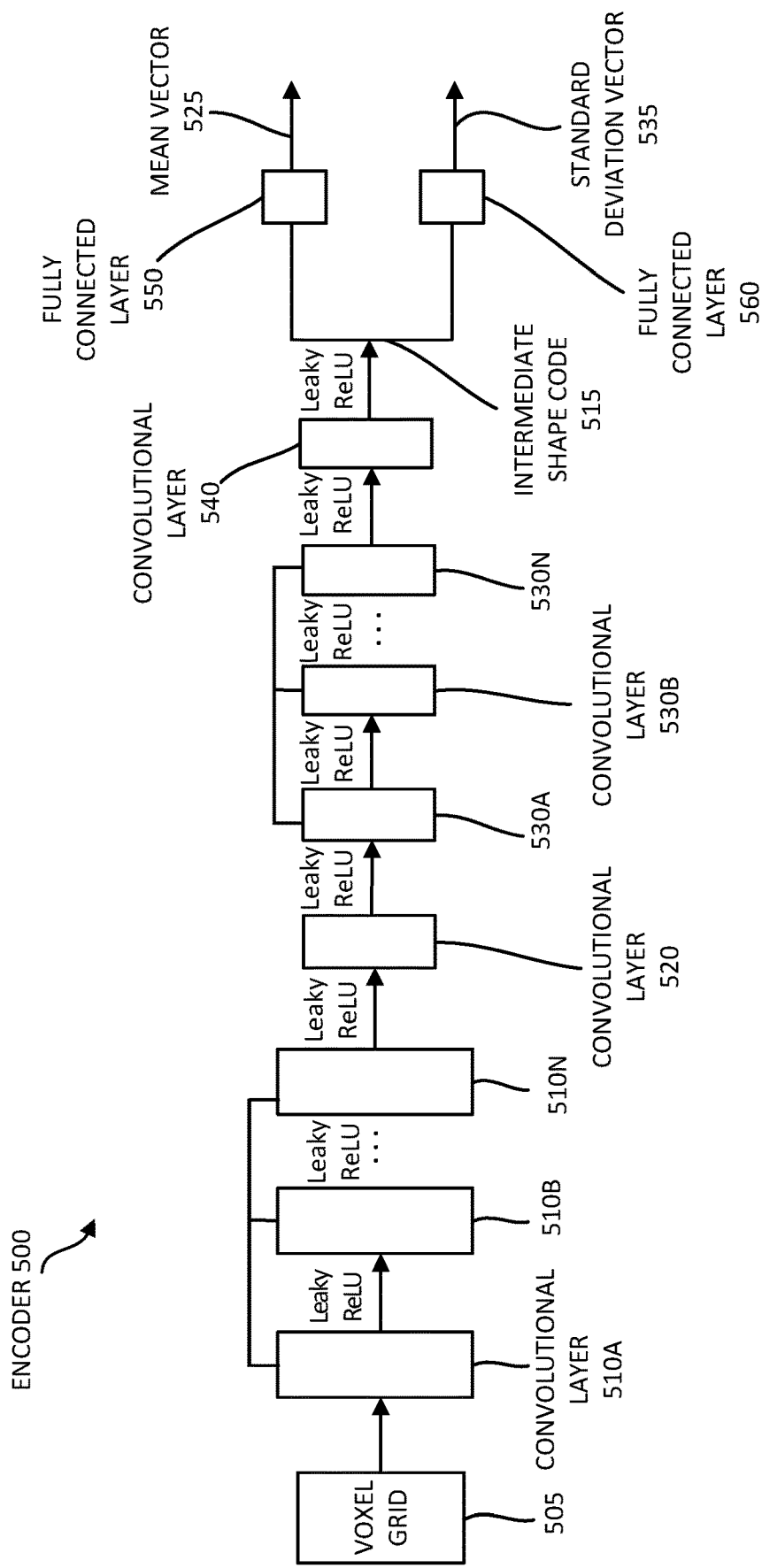
FIG. 5 is a block diagram depicting an example of an encoder for voxel grid representations, according to certain embodiments.

FIG. 5 shows an encoder 500 for voxel grid representations, according to certain embodiments. The encoder 500 includes components similar to those discussed in connection with the encoder 300 of FIG. 3. In particular, the encoder 500 comprises a series of convolutional layers 510A to 510N, 520, 530A to 530N, and 540 that ultimately produce an intermediate shape code 515 as input to fully-connected layers 550 and 560. The fully-connected layer 550 and the fully-connected layer 560 respectively produce a mean vector 525 and a standard deviation vector 535. The mean vector 525 and the standard deviation vector 535 respectively correspond to a mean and a standard deviation of a probability distribution (e.g., a Gaussian distribution) describing a neighborhood of unicodes to which a voxel grid 505 provided as input to the first convolutional layer 510A maps. In certain embodiments, each convolutional layer 510, 520, 530, and 540 is followed by an activation function implemented using, for example, a leaky ReLU.

The outputs of the convolutional layers 510A to 510N are concatenated, as are the outputs of the convolutional layers 530A to 530N. The convolutional layer 510N corresponds to a low-resolution jump that reduces the size of the data to be processed by the convolutional layer 520. The low-resolution jump is performed, for example, using a stride length of two for the convolutional layer 510N versus a stride length of one for each of the remaining convolutional layers 510. The number of low-resolution jumps, and thus the total number of convolutional layers in the encoder 500, depends on the size of the voxel grid 505. As an example, a $32^3$ voxel grid can be processed through a series of convolutional layers that produce $8 \times 16^3$ matrix values (e.g., at the output of convolutional layer 510N), followed by a series of convolutional layers (not depicted) that produce $8 \times 8^3$ matrix values, and then a series of convolutional layers that produce $6 \times 8^3$ matrix values (e.g., at the output of convolutional layer 530N). The convolutional layer 540 would then generate $2 \times 8^3$ matrix values, which are represented in vector form, as the intermediate shape code 515.

Figure 6:
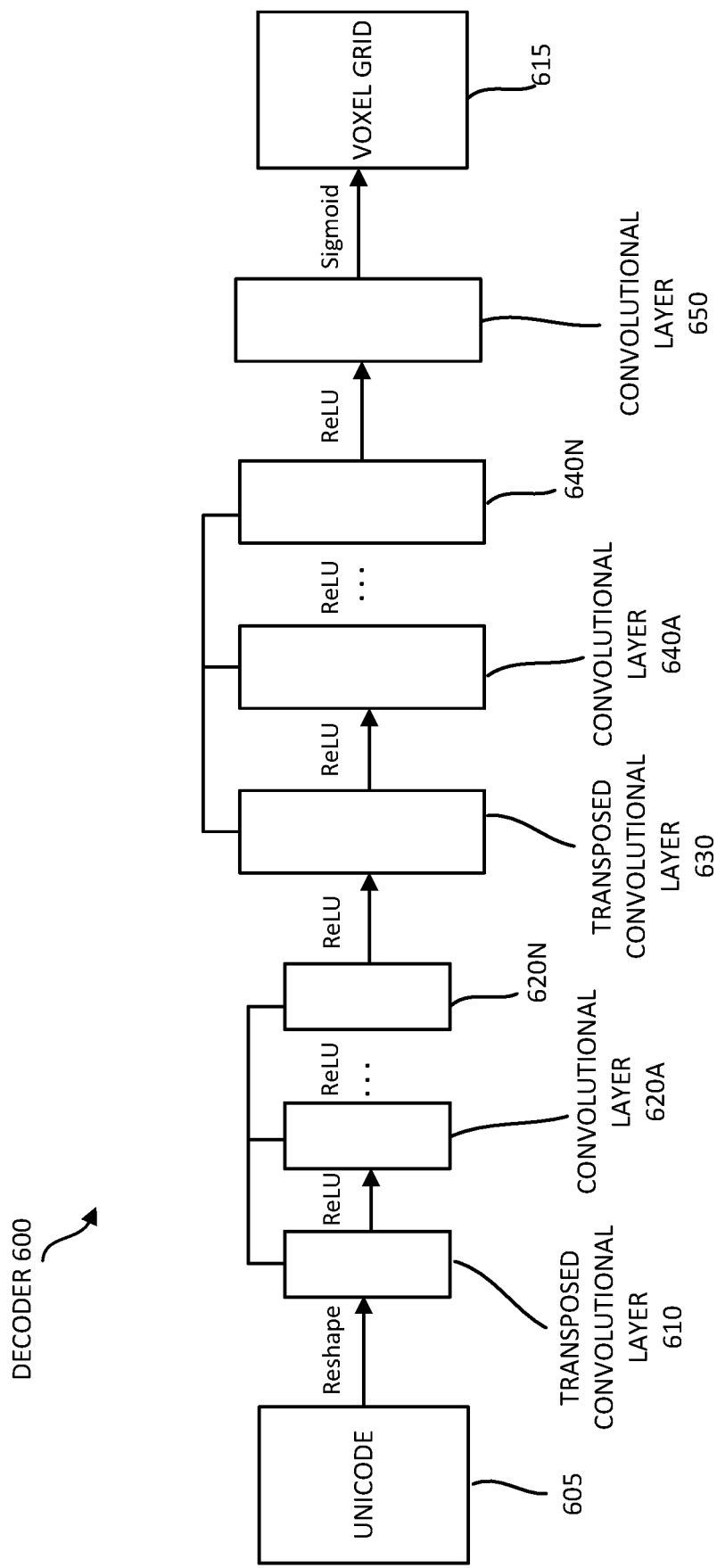
FIG. 6 is a block diagram depicting an example of an decoder for voxel grid representations, according to certain embodiments.

FIG. 6 shows a decoder 600 for voxel grid representations, according to certain embodiments. The decoder 600 receives a unicode 605 as input to a transposed convolutional layer 610, which is followed by a series of convolutional layers 620A to 620N. The outputs of the transposed convolutional layer 610 and the convolutional layers 620 are concatenated for input to a transposed convolutional layer 630, which is followed by a series of convolutional layers 640A to 640N. The transposed convolutional layer 610 and the transposed convolutional layer 630 correspond to high-resolution jumps that are implemented, for example, using a stride length of two versus a stride length of one for each of the convolutional layers 620 and 640. The outputs of the transposed convolutional layer 630 and the convolutional layers 640 are concatenated for input to a convolutional layer 650 that produces an output corresponding to a voxel grid 615. In certain embodiments, voxel grid 615 is the result of applying a sigmoid function to the output of the convolutional layer 650. In certain embodiments, the transposed convolutional layers 610 and 630 and the convolutional layers 620 and 640 are followed by an activation function implemented using, for example, a ReLU.

From the examples of FIGS. 3 to 6, it will be apparent that suitable neural network based encoders and decoders can be constructed for generating a unicode based on an input shape representation, as well as generating a target shape representation based on an input unicode. In particular, the examples of FIGS. 3 to 6 involve using convolution to produce an intermediate shape code from an input shape representation, with the intermediate shape code being used as the output unicode or to generate additional unicodes according to a probability distribution. Further, FIGS. 3 to 6 involve using transposed convolution or a mix of transposed convolution and convolution to convert the input unicode into the target shape representation. FIGS. 3 to 6 are merely illustrative examples. Other neural network designs for handling voxel grid and point cloud representations are also possible. Additionally, the techniques described in connection with FIGS. 3 to 6 can be applied to other types of shape representations, for example, multi-image representations.

Figure 7:
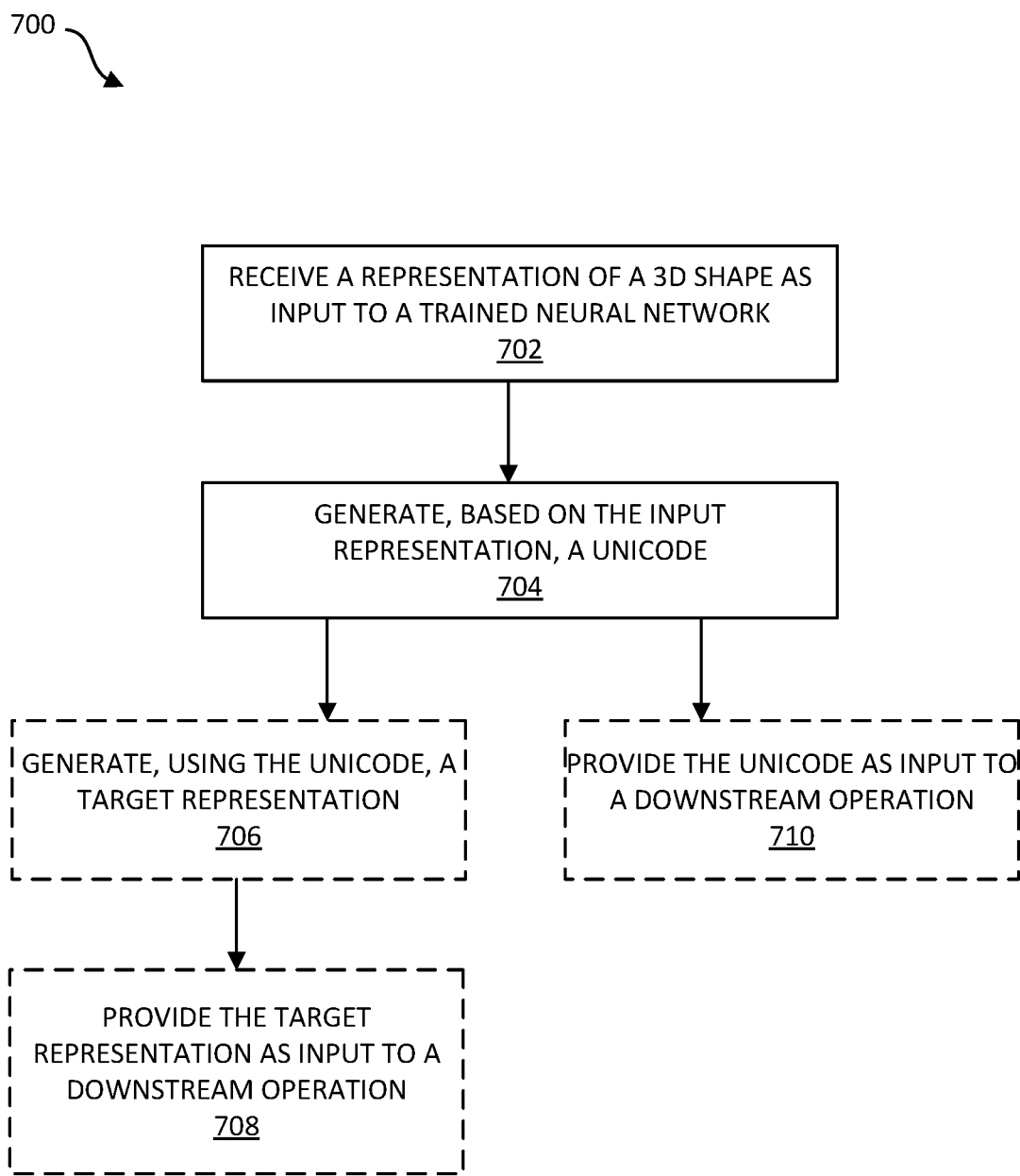
FIG. 7 is a flow chart depicting an example process for generating a unicode, according to certain embodiments.

FIG. 7 shows an example process 700 for generating a unicode, according to certain embodiments. One or more computing devices executing suitable program code (e.g., code for executing NN 110 on one or more processors of computing system 100 in FIG. 1) implement operations depicted by FIG. 7. For illustrative purposes, the process 700 is described with reference to certain examples depicted in the figures. Other implementations, however, are possible.

At block 702, a shape representation is received as input to a trained neural network (e.g., NN 110). The shape representation is a representation of a 3D shape and corresponds to one of the different types of representations on which the neural network was trained earlier.

At block 704, the neural network generates a unicode based on the input shape representation from block 702. If the neural network is implemented according to the example in FIG. 2, the input shape representation is processed by an encoder specifically trained for the type of shape representation to which the input shape representation corresponds. For example, if the input shape representation is a point cloud, then the input shape representation is input to a point cloud encoder that has been trained to generate unicodes using point clouds. As described earlier, unicodes generated according to embodiments of the present disclosure comprise a vector of embeddings whose values depend on features provided by multiple types of shape representations, with the embedding values that depend on features not present in the input shape representation being inferred from the input shape representation.

At block 706, the unicode is used to generate a target shape representation for the 3D shape. The target shape representation can be the same or a different type of representation than the input shape representation received at block 702. Continuing with the point cloud example described in connection with block 704, the unicode generated from the point cloud can be input to a point cloud decoder that infers features of a point cloud representation based on the unicode, thereby reconstructing the original point cloud or an approximation thereof. The reconstructed point cloud may not be completely identical to the original point cloud, but is at least visually similar (e.g., in size, overall shape, and other pertinent attributes). Alternatively, the unicode generated from the point cloud can be input to a different decoder (e.g., a voxel grid decoder) to generate a different type of representation for the 3D shape.

At block 708, the target shape representation from block 706 is provided as input to a downstream operation. For example, in some cases, the target shape representation is a multi-image representation that is input to an image processing software application running on the same computing system or on an external computing system (e.g., a cloud server). The processing in blocks 706 and 708 is useful for generating representations for use by systems that are not specifically designed to handle unicode input.

In addition, or as an alternative, to the processing in blocks 706 and 708, the unicode from block 704 can be provided as input to a downstream operation (block 710). For instance, in some cases the unicode is not only a product of a neural network, but is also input to another neural network configured to perform further tasks based on the unicode. Such additional tasks include, in some cases, identifying different segments of the 3D shape, predicting a class of the 3D shape and retrieving other shapes of the same predicted class, and/or identifying, for a particular point on the 3D shape, a corresponding point on another 3D shape.

Figure 8:
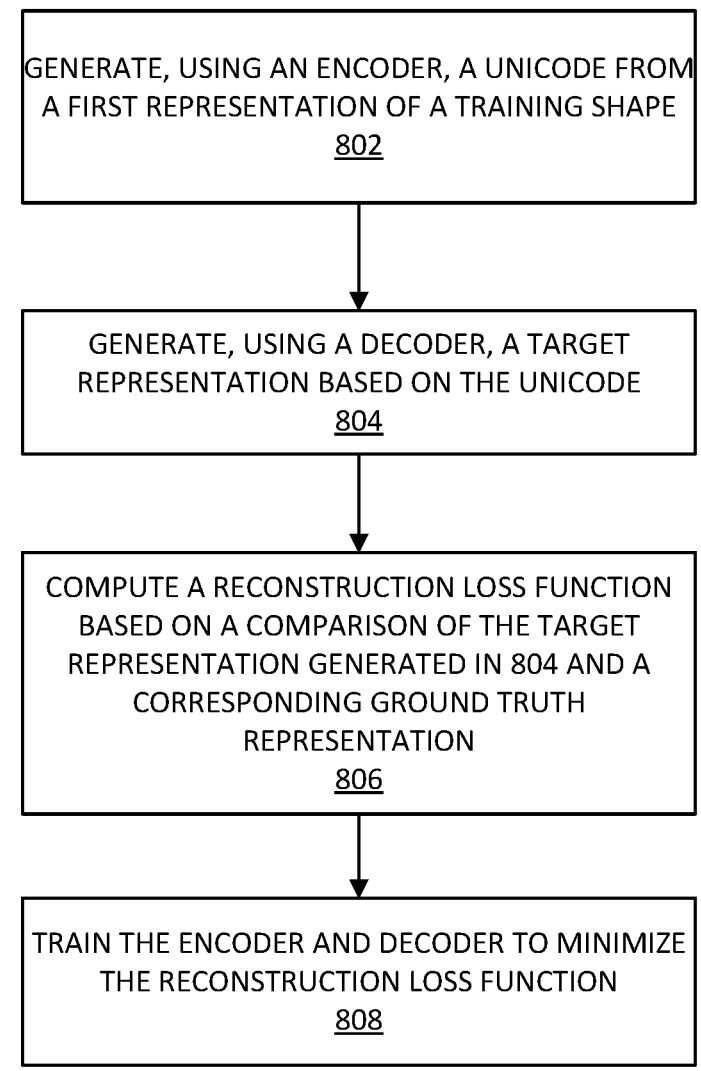
FIGS. 8 to 10 are flow charts depicting example processes for training a neural network, according to certain embodiments.
Figure 9:
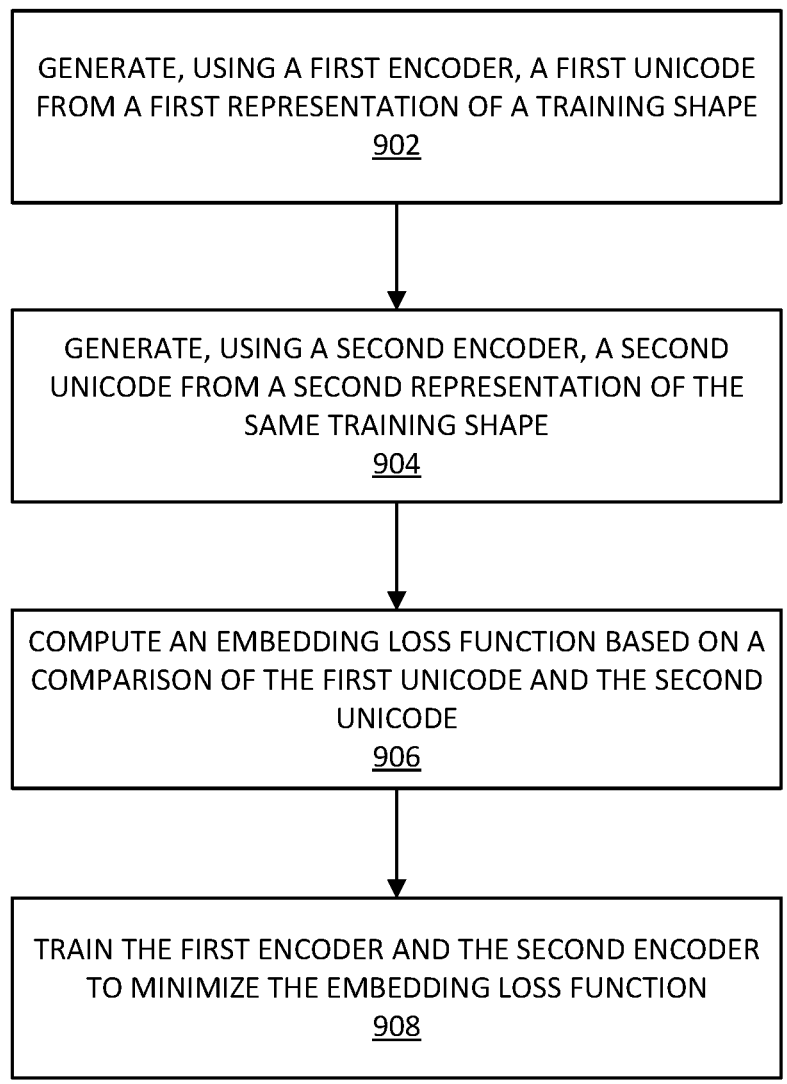
Figure 10:
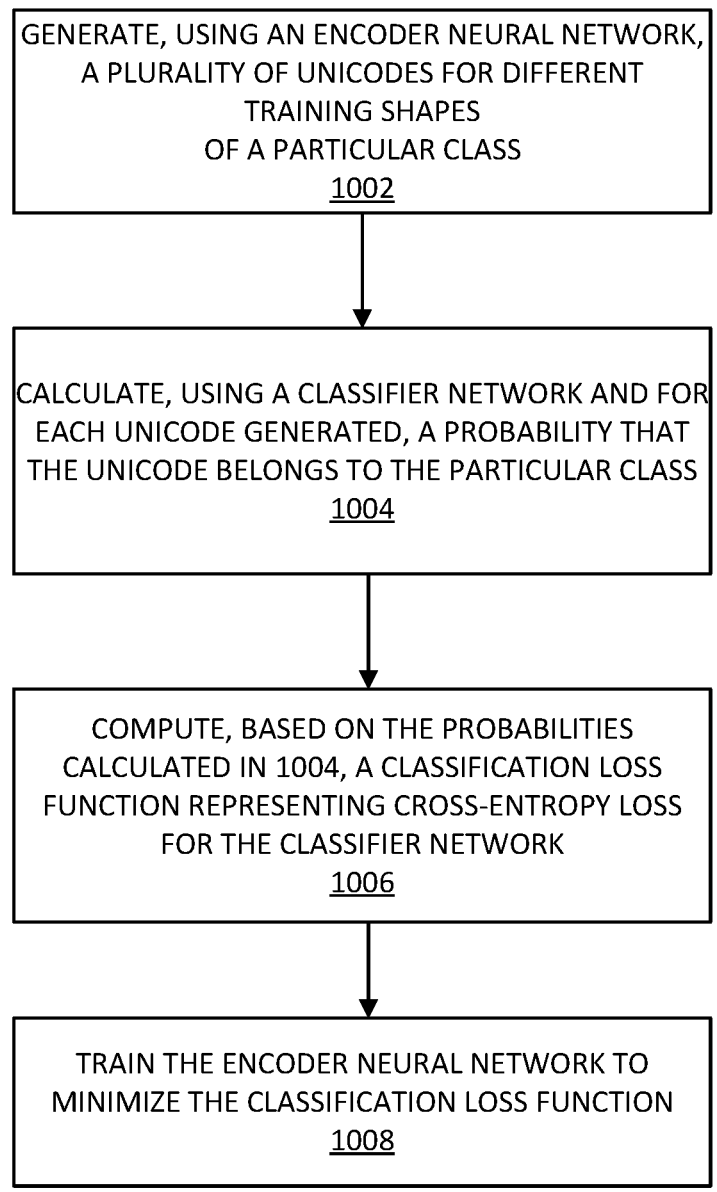

FIGS. 8 to 10 show example processes for training a neural network to generate unicodes, according to certain embodiments. One or more computing devices executing suitable program code (e.g., code for executing NN 110 on one or more processors of computing system 100 in FIG. 1) implement operations depicted by FIGS. 8 to 10. For illustrative purposes, the processing depicted in FIGS. 8 to 10 is described with reference to certain examples depicted in the figures. Other implementations, however, are possible.

FIG. 8 shows an example process 800 for training a neural network based on reconstruction loss. As mentioned earlier, reconstruction loss corresponds to a difference between a target representation generated by the decoder neural network based on a unicode, and a ground truth representation, where the encoder neural network generates the unicode based on a particular input shape representation. Process 800 begins at block 802, with an encoder (e.g., one of E1 to EN in FIG. 2) generating a unicode from a first representation of a training shape (e.g., a voxel grid representation of one of the shapes from the training set 240).

At block 804, the unicode from block 802 is input to a decoder (e.g., one of decoders D1 to DN in FIG. 2) that generates a target representation based on the unicode. The target representation can be of the same or a different type than the first representation that was provided in block 802.

At block 806, a reconstruction loss function is computed based on a comparison of the target representation generated in block 804 and a corresponding ground truth representation for the training shape (e.g., a ground truth representation included in the training set 240). For example, a target representation generated by a point cloud decoder would be compared to a ground truth point cloud. Different distance metrics are used for computing reconstruction loss depending on the type of shape representation being compared. In certain embodiments, per-voxel cross-entropy is used for voxel grids, chamfer distance for point clouds, and mean squared difference for multi-view images.

At block 808, the encoder from block 802 and the decoder from block 804 are trained (e.g., by adjusting their weights and/or biases) to minimize the reconstruction loss function. In certain embodiments, the processing in blocks 802 to 806 is repeated for all the different types of shape representations that can be generated by the neural network, e.g., to compute reconstruction losses for each type of shape representation that encoder network 210 can generate a unicode from, and for each of the different types of shape representations that decoder network 220 can generate. The resulting reconstruction loss function $L_{reconstruct}$ is as follows:

$$\mathcal{L}_{reconstruct} = \sum_{x \in R} \sum_{y \in R} w_{x \to y} Dist_y(D_y(E_x(S_x)), S_y) \quad (1)$$

where for each input representation x for a shape S, the unicode resulting from encoding the input representation via operation $E_x$ is decoded to a target representation via operation $D_y$, and then compared to a ground truth representation y provided for the shape S. In this manner, each encoder E1 to EN in FIG. 2 is trained against reconstruction losses based on the outputs of each decoder D1 to DN, and each decoder D1 to DN is trained against reconstruction losses based on the outputs of each encoder E1 to EN.

FIG. 9 shows an example process 900 for training a neural network based on embedding loss. As mentioned earlier, embedding loss corresponds to a difference between a unicode produced by the encoder neural network using a first type of shape representation (e.g., voxel grid) and a unicode produced by the encoder neural network using a second, different type of shape representation (e.g., point cloud). Process 900 begins at block 902, with a first encoder (e.g., one of E1 to EN) generating a first unicode from a first representation of a training shape (e.g., a voxel grid representation of one of the shapes from the training set 240).

At block 904, a second encoder (e.g., a different one of E1 to EN) generates a second unicode from a second representation (e.g., a point cloud representation) of the same training shape for which the first representation was provided at block 902. In this manner, multiple unicodes are generated from different types of representations for the same training shape.

At block 906, an embedding loss function is computed based on a comparison of the first unicode from block 902 and the second unicode from block 904.

At block 908, the first encoder and the second encoder are trained to minimize the embedding loss function (e.g., by adjusting the weight and/or biases used in blocks 902 and 904). In certain embodiments, the processing in blocks 902 to 906 is repeated for all types of shape representations that can be encoded (e.g., so that encoder E1 is trained against embedding losses based on the outputs of encoders E2 to EN, encoder E2 is trained against embedding losses based on the outputs of E1 and E3 to EN, and so on). The embedding loss function $L_{embedding}$ would therefore be represented as follows:

$$\mathcal{L}_{embedding} = \sum_{x \in R} \sum_{y \in (R \setminus x)} |E_x - E_y|_1 \quad (2)$$

where for each input representation x and for each input representation y that is not x, the absolute value of the difference between the unicodes generated by encoding x and y is summed with other similarly computed absolute values. Further, if the above loss function is applied to embodiments where the encoder generates a mean and a standard deviation of a probability distribution describing a neighborhood of unicodes (e.g., encoder 300 or encoder 500), training on the loss function would reduce the differences between the means for unicodes derived from different types of input shape representations as well as the differences between the standard deviations for unicodes derived from different types of shape representations.

FIG. 10 shows an example process 1000 for training a neural network based on classification loss. As mentioned earlier, classification loss corresponds to errors in the predictions produced by a classifier that operates on the unicodes generated by the encoder neural network. Process 1000 begins at block 1002 with an encoder neural network (e.g., encoder network 210) generating a plurality of unicodes for different training shapes of a particular class (e.g., using voxel grid, point cloud, and multi-image representations of different car shapes).

At block 1004, for each unicode generated at block 1002, a probability that the unicode belongs to the particular class is calculated using a classifier network (e.g., classifier 230). In particular, the classifier network predicts a value corresponding to the probability that the shape for which the unicode was generated belongs to that particular class, for instance, a value from zero to one for the class "car", where a value of one indicates the highest degree of certainty that the shape is a car.

At block 1006, a classification loss function is computed based on the probabilities calculated in block 1004. The classification loss function represents cross-entropy loss for the classifier neural network that produced the probabilities.

At block 1008, the encoder neural network is trained to minimize the classification loss function, e.g., by adjusting the weights and/or biases used to generate the unicodes in block 1002. In certain embodiments, the classifier network is also trained at block 1008, e.g., by adjusting the weights and/or biases used to calculate the probabilities in block 1004.

The loss functions described in connection with FIGS. 8 to 10 can be used as standalone loss functions. However, in certain embodiments, training is performed based on a loss function $L_{total}$ computed by summing each of the loss functions described in connection with FIGS. 8 to 10 as follows:

$$\mathcal{L}_{total} = \mathcal{L}_{reconstruct} + \mathcal{L}_{embedding} + \mathcal{L}_{classification} \quad (3)$$

Examples of a Computing Environment for Implementing Certain Embodiments

Figure 11:
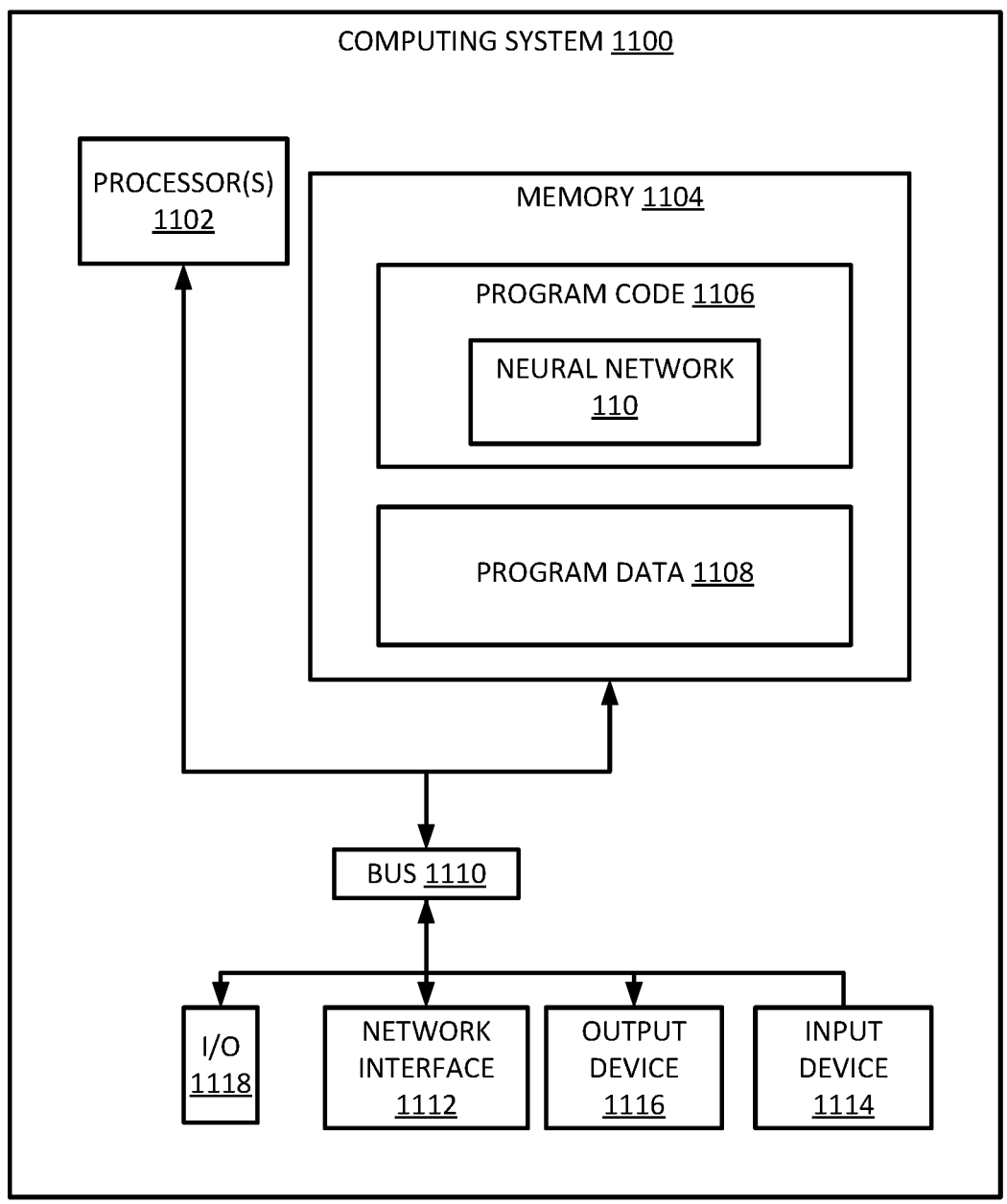
FIG. 11 depicts an example of a computing system for implementing certain embodiments of the present disclosure.

Any suitable computing system or group of computing systems can be used for performing the operations described herein. For example, FIG. 11 depicts an example of an computing system 1100 usable for implementing one or more of NN 110 and the UI subsystem 120 in FIG. 1. In an embodiment, a single computing system 1100 having devices similar to those depicted in FIG. 11 (e.g., a processor, a memory, etc.) combines the one or more operations and data stores depicted as separate subsystems in FIG. 1.

The depicted example of the computing system 1100 includes a processor 1102 communicatively coupled to one or more memory devices 1104. The processor 1102 executes computer-executable program code stored in a memory device 1104, accesses information stored in the memory device 1104, or both. Examples of the processor 1102 include a microprocessor, an application-specific integrated circuit ("ASIC"), a field-programmable gate array ("FPGA"), or any other suitable processing device. The processor 1102 can include any number of processing devices, including a single processing device.

The memory device 1104 includes any suitable non-transitory computer-readable medium for storing program code 1106, program data 1108, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 1104 can be volatile memory, non-volatile memory, or a combination thereof.

The computing system 1100 executes program code 1106 that configures the processor 1102 to perform one or more of the operations described herein. Examples of the program code 1106 include, in various embodiments, program code implementing functionality associated with the NN 110, the UI subsystem 120, or any other suitable systems or subsystems that perform one or more operations described herein. The program code 1106 may be resident in the memory device 1104 or any suitable computer-readable medium and may be executed by the processor 1102 or any other suitable processor.

The processor 1102 is an integrated circuit device that can execute the program code 1106. The program code 1106 can be for executing an operating system, an application system or subsystem (e.g., NN 110), or both. When executed by the processor 1102, the instructions cause the processor 1102 to perform operations of the program code 1106. When being executed by the processor 1102, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In certain embodiments, the program data 1108 includes data for training NN 110 (e.g., the training set of shape representations 240 in FIG. 2), configuration data for the NN 110 (e.g., pre-training or post-training weights and biases), a unicode generated from an input shape representation, a target shape representation generated from a unicode, or any combination thereof.

In certain embodiments, the program code 1106 and/or the program data 1108 are distributed across multiple memory devices 1104 that are accessible via a data network. One or more buses 1110 are also included in the computing system 1100. The buses 1110 communicatively couple components of the computing system 1100 to each other and/or to external components.

In certain embodiments, the computing system 1100 includes a network interface device 1112. The network interface device 1112 includes any device or group of devices suitable for establishing a wired or wireless data connection to one or more data networks. Non-limiting examples of the network interface device 1112 include an Ethernet network adapter, a modem, and/or the like. The computing system 1100 is able to communicate with one or more other computing devices (e.g., a computing device performing a downstream operating on a unicode generated by computing system 1100) via a data network using the network interface device 1112.

The computing system 1100 may also include a number of external or internal devices, an input device 1114, an output device 1116, or other input or output devices. For example, the computing system 1100 is shown with one or more input/output ("I/O") interfaces 1118. An I/O interface 1118 can receive input from input devices or provide output to output devices. An input device 1114 can include any device or group of devices suitable for receiving visual, auditory, or other suitable input that controls or affects the operations of the processor 1102. Non-limiting examples of the input device 1114 include a touchscreen, a mouse, a keyboard, a microphone, a separate mobile computing device, etc. An output device 1116 can include any device or group of devices suitable for providing visual, auditory, or other suitable sensory output. Non-limiting examples of the output device 1116 include a touchscreen, a monitor, a speaker, a separate mobile computing device, etc.

Although FIG. 11 depicts the input device 1114 and the output device 1116 as being local to the computing system 1100, other implementations are possible. For instance, in some embodiments, one or more of the input device 1114 and the output device 1116 can include a remote client-computing device that communicates with the computing system 1100 via the network interface device 1112 using one or more data networks described herein.

Figure 12:
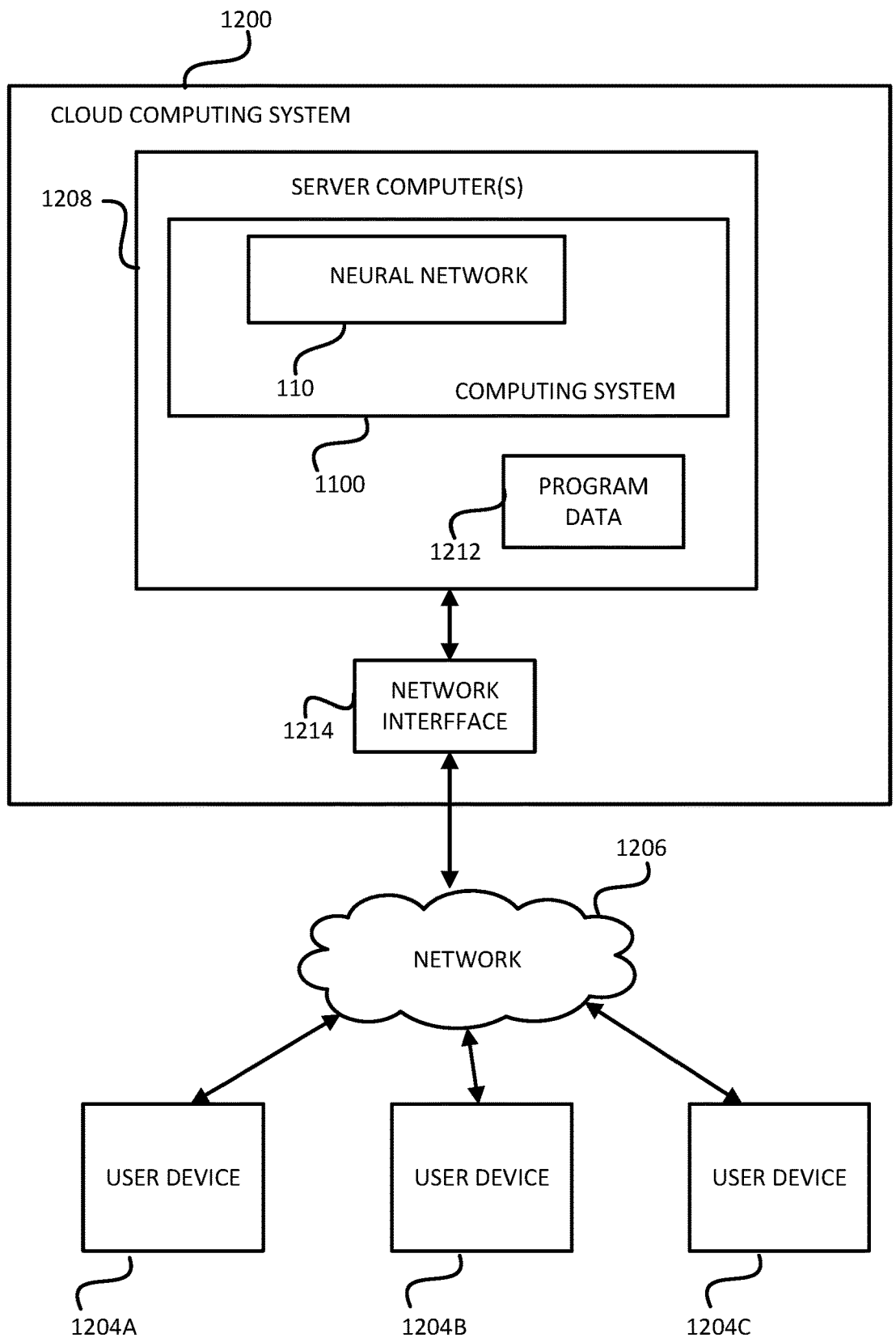
FIG. 12 depicts an example of a cloud computing system for implementing certain embodiments of the present disclosure.

In some embodiments, the functionality provided by the computing system 1100 may be offered as cloud services by a cloud service provider. For example, FIG. 12 depicts an example of a cloud computing system 1200 offering one or more shape-related services that can be used by a number of user subscribers using user devices 1204A, 1204B, and 1204C across a network 1206. In certain embodiments, the shape-related services provided by cloud computing system 1200 include a service that generates target representations and/or unicode representations based on input shape representations supplied by the user devices 1204A to 1204C. In some cases, the shape-related services may be offered under a Software as a Service (SaaS) model. One or more users may subscribe to the shape-related services, and the cloud computing system performs the processing to provide the shape-related services to subscribers. The cloud computing system 1200 may include one or more remote server computers 1208.

The remote server computers 1208 include any suitable non-transitory computer-readable medium for storing program code (e.g., code for NN 110), program data 1212, or both, which is used by the cloud computing system 1200 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1208 can include volatile memory, non-volatile memory, or a combination thereof.

One or more of the servers 1208 execute the program code 1210 that configures one or more processors of the server computers 1208 to perform one or more of the operations that provide shape-related services, such as generating target or unicode representations, and analyzing the target or unicode representations. Any other suitable systems or subsystems that perform one or more operations described herein (e.g., a UI subsystem for receiving input shape representations or training shape representations) can also be implemented by the cloud computing system 1200.

In certain embodiments, the cloud computing system 1200 may implement the services by executing program code and/or using program data 1212, which may be resident in a memory device of the server computers 1208 or any suitable computer-readable medium and may be executed by the processors of the server computers 1208 or any other suitable processor. In certain embodiments, the program data 1212 includes any of the data described in connection with program data 1108. The program data 1212 is stored on the same memory device or distributed across different memory devices accessible via the network 1206.

The cloud computing system 1200 also includes a network interface device 1214 that enables communications to and from cloud computing system 1200. In certain embodiments, the network interface device 1214 includes any device or group of devices suitable for establishing a wired or wireless data connection to the network 1206. Non-limiting examples of the network interface device 1214 include an Ethernet network adapter, a modem, and/or the like. The computing system 1100 is able to communicate with the user devices 1204A to 1204C via the network 1206 using the network interface device 1214.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   receiving, by a computing system, a first representation of a three-dimensional (3D) shape, wherein the first representation corresponds to a first type of shape representation; and
   generating, by the computing system and using a neural network that has been trained on different types of shape representations, a unified representation for the 3D shape, wherein:
      the different types of shape representations comprise multiple different types of shape representations of a particular 3D shape, the multiple different types of shape representations comprising at least one type that is different from the first type of shape representation, the multiple different types of shape representations of the particular 3D shape using different ways to represent the particular 3D shape,
      the unified representation comprises a vector of embeddings and values for the embeddings, the values being inferred by the neural network based on the first representation of the 3D shape,
      the vector includes at least one embedding whose value is dependent on a feature provided by a second type of shape representation of the 3D shape and not provided by the first type of shape representation of the 3D shape, and
      the generating comprises inferring the value of the at least one embedding based upon the first representation of the 3D shape and in the absence of the second type of shape representation for the 3D shape.

2. The method of claim 1, wherein the neural network has been trained on at least the first type of shape representation and the second type of shape representation.

3. The method of claim 1, wherein the neural network comprises an encoder that generates the unified representation and a decoder configured to generate a target representation for the 3D shape based upon the unified representation, the target representation corresponding to one of the different types shape representations on which the neural network has been trained.

4. The method of claim 3, further comprising:
   generating, by the decoder, the target representation for the 3D shape, wherein the target representation corresponds to the second type of shape representation, and wherein the generating of the target representation comprises inferring a feature of the second type of shape representation based upon the values of the embeddings in the unified representation.

5. The method of claim 3, further comprising:
prior to the receiving of the first representation for the 3D shape, training the neural network, the training comprising:
generating, by the encoder, a unified representation for a training shape based upon an input representation for the training shape, the input representation for the training shape corresponding to the first type of shape representation;
decoding, by the decoder, the unified representation for the training shape into a target representation for the training shape;
computing a reconstruction loss function based on a difference between the target representation for the training shape and a ground truth representation for the training shape; and
training the encoder and the decoder to minimize the reconstruction loss function.

6. The method of claim 1, further comprising:
prior to the receiving of the first representation for the 3D shape, training the neural network, the training comprising:
generating, by the neural network, a first unified representation for a training shape based upon a first input representation for the training shape, the first input representation for the training shape corresponding to the first type of shape representation;
generating, by the neural network, a second unified representation for the training shape based upon a second input representation for the training shape, the second input representation for the training shape corresponding to the second type of shape representation;
computing an embedding loss function based on a difference between the first unified representation for the training shape and the second unified representation for the training shape; and
training the neural network to minimize the embedding loss function.

7. The method of claim 6, wherein the first unified representation for the training shape is generated based on a first probability distribution and the second unified representation for the training shape is generated based on a second probability distribution, and wherein minimizing the embedding loss function minimizes at least one of a difference between:
a mean of the first probability distribution and a mean of the second probability distribution; or
a standard deviation of the first probability distribution and a standard deviation of the second probability distribution.

8. The method of claim 1, further comprising:
prior to the receiving of the first representation for the 3D shape, training the neural network, the training comprising:
generating, by the neural network, a plurality of unified representations for different training shapes that belong to a particular class of shape;
applying the plurality of unified representations for the different training shapes as input to a classifier configured to calculate, for each input to the classifier, a probability that the training shape represented by the input belongs to the particular class of shape;
computing, based on the probabilities calculated by the classifier, a classification loss function corresponding to cross-entropy loss for the classifier; and
training the neural network to minimize the classification loss function.

9. The method of claim 1, further comprising:
providing, by the computing system, the unified representation of the 3D shape as an input for performing one or more of the following:
identifying different segments of the 3D shape;
predicting a class of the 3D shape and retrieving other shapes of the same predicted class; or
identifying, for a particular point on the 3D shape, a corresponding point on another 3D shape.

10. A non-transitory computer-readable medium having program code that is stored thereon, the program code executable by one or more processing devices for performing operations comprising:
receiving a plurality of representations for a three-dimensional (3D) shape, the plurality of representations of the 3D shape using different ways to represent the 3D shape and including a first representation corresponding to a first type of shape representation of the 3D shape and a second representation corresponding to a second type of shape representation of the 3D shape different from the first type of shape representation; and
training a neural network, wherein the training comprises:
generating, by the neural network, a unified representation for the 3D shape, wherein the unified representation comprises a vector of embeddings and values for the embeddings, the values being inferred by the neural network based upon the first representation, wherein the vector includes at least one embedding whose value is dependent upon a feature provided by the second type of shape representation and not provided by the first type of shape representation, and wherein the generating comprises inferring the value of the at least one embedding based upon the first representation and without using the second type of shape representation for the 3D shape;
generating, by the neural network, a third representation for the 3D shape, wherein the generating of the third representation comprises inferring a feature of the second type of shape representation based upon the values of the embeddings in the unified representation;
calculating a reconstruction loss function using the second representation as a ground truth representation, the reconstruction loss function corresponding to a difference between the second representation and the third representation; and
adjusting, based upon the reconstruction loss function, at least one of a weight or a bias value used by the neural network for generating the unified representation.

11. The non-transitory computer-readable medium of claim 10, wherein the training further comprises:
adjusting, based upon the reconstruction loss function, at least one of a weight or a bias value used by the neural network for generating the third representation.

12. A computing system comprising:
means for receiving a first representation of a three-dimensional (3D) shape, wherein the first representation corresponds to a first type of shape representation; and
means for generating a unified representation for the 3D shape, wherein the means for generating the unified representation has been trained on different types of shape representations, wherein:

the different types of shape representations comprise multiple different types of shape representations of a particular 3D shape, the multiple different types of shape representations comprising at least one type that is different from the first type of shape representation, the multiple different types of shape representations of the particular 3D shape using different ways to represent the particular 3D shape, the unified representation comprises a vector of embeddings and values for the embeddings, the values being inferred, by the means for generating the unified representation, based on the first representation of the 3D shape, the vector includes at least one embedding whose value is dependent on a feature provided by a second type of shape representation of the 3D shape and not provided by the first type of shape representation of the 3D shape, and the generating comprises inferring the value of the at least one embedding based upon the first representation of the 3D shape and in the absence of the second type of shape representation for the 3D shape.

13. The computing system of claim 12, wherein the means for generating the unified representation has been trained on at least the first type of shape representation and the second type of shape representation.

14. The computing system of claim 12, further comprising:

means for generating a target representation for the 3D shape based upon the unified representation, the target representation corresponding to one of the different types of shape representations on which the means for generating the unified representation has been trained.

15. The computing system of claim 14, wherein the target representation corresponds to the second type of shape representation, and wherein the means for generating the target representation is configured to infer a feature of the second type of shape representation based upon the values of the embeddings in the unified representation.

16. The computing system of claim 14, wherein the means for generating the unified representation for the 3D shape is trained prior to the receiving of the first representation for the 3D shape, the training comprising:

generating, by the means for generating the unified representation for the 3D shape, a unified representation for a training shape based upon an input representation for the training shape, the input representation for the training shape corresponding to the first type of shape representation;

generating, by the means for generating the target representation for the 3D shape, a target representation for the training shape based upon the unified representation for the training shape;

computing a reconstruction loss function corresponding to a difference between the target representation for the training shape and a ground truth representation for the training shape; and training the means for generating the unified representation for the 3D shape to minimize the reconstruction loss function.

17. The computing system of claim 12, wherein the means for generating the unified representation for the 3D shape is trained prior to the receiving of the first representation for the 3D shape, the training comprising:

generating, by the means for generating the unified representation for the 3D shape, a first unified representation for a training shape based upon a first input representation for the training shape, the first input representation for the training shape corresponding to the first type of shape representation;

generating, by the means for generating the unified representation for the 3D shape, a second unified representation for the training shape based upon a second input representation for the training shape, the second input representation for the training shape corresponding to the second type of shape representation;

computing an embedding loss function corresponding to a difference between the first unified representation for the training shape and the second unified representation for the training shape; and training the means for generating the unified representation for the 3D shape to minimize the embedding loss function.

18. The computing system of claim 17, wherein the first unified representation for the training shape is generated based on a first probability distribution and the second unified representation for the training shape is generated based on a second probability distribution, and wherein minimizing the embedding loss function minimizes at least one of a difference between:

a mean of the first probability distribution and a mean of the second probability distribution; or a standard deviation of the first probability distribution and a standard deviation of the second probability distribution.

19. The computing system of claim 12, wherein the means for generating the unified representation for the 3D shape is trained prior to the receiving of the first representation for the 3D shape, the training comprising:

generating, by the means for generating the unified representation for the 3D shape, a plurality of unified representations for different training shapes that belong to a particular class of shape;

applying the plurality of unified representations for the different training shapes as input to a classifier configured to calculate, for each input, a probability that the input belongs to the particular class of shape;

computing, based on the probabilities calculated by the classifier, a classification loss function representing cross-entropy loss for the classifier; and training the means for generating the unified representation for the 3D shape to minimize the classification loss function.

20. The computing system of claim 12, further comprising:

means for providing the unified representation of the 3D shape as an input for performing one or more of the following:

identifying different segments of the 3D shape;

predicting a class of the 3D shape and retrieving other shapes of the same predicted class; or identifying, for a particular point on the 3D shape, a corresponding point on another 3D shape.

* * * * *